(12) United States Patent
Owejan et al.

(10) Patent No.: US 8,034,502 B2
(45) Date of Patent: Oct. 11, 2011

(54) WATER REMOVAL SYSTEM FOR NON-REACTIVE REGIONS IN PEFMC STACKS

(75) Inventors: Jon P. Owejan, Honeoye, NY (US); Thomas W. Tighe, Bloomfield, NY (US); Thomas A. Trabold, Pittsford, NY (US); Jeffrey A. Rock, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 999 days.

(21) Appl. No.: 11/695,200

(22) Filed: Apr. 2, 2007

(65) Prior Publication Data

US 2008/0241607 A1 Oct. 2, 2008

(51) Int. Cl.
*H01M 8/04* (2006.01)
(52) U.S. Cl. ........ 429/450; 429/414; 429/457; 429/483; 429/480

(58) Field of Classification Search .................... 429/34, 429/38, 39, 30, 26, 27, 13, 17
See application file for complete search history.

(56) References Cited

U.S. PATENT DOCUMENTS

| 4,175,165 | A | 11/1979 | Adlhart | |
|---|---|---|---|---|
| 2005/0158593 | A1* | 7/2005 | Minehisa et al. | 429/12 |
| 2007/0072016 | A1* | 3/2007 | St-Pierre et al. | 429/13 |

* cited by examiner

*Primary Examiner* — Raymond Alejandro
(74) *Attorney, Agent, or Firm* — Dinsmore & Shohl LLP

(57) ABSTRACT

A device and method to extract water from a moisture-rich fuel cell flowpath. A water transport unit is integrated into the fuel cell so that liquid water stagnation within flow channels and manifolds is reduced. In one embodiment, the device includes numerous flowpaths that include an active region and an inactive region. The water transport unit includes a hydrophilic member such that upon passage of a fluid with the excess water through the inactive region of the device flowpath and into the presence of the hydrophilic member, it absorbs excess water from the fluid.

24 Claims, 8 Drawing Sheets

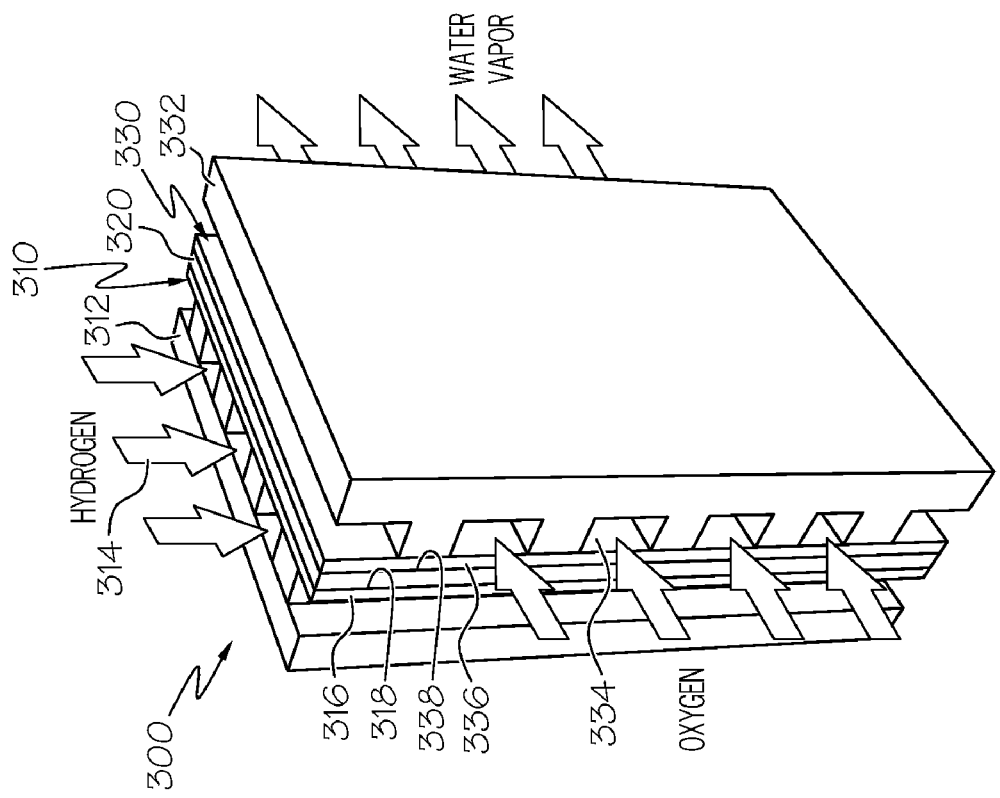
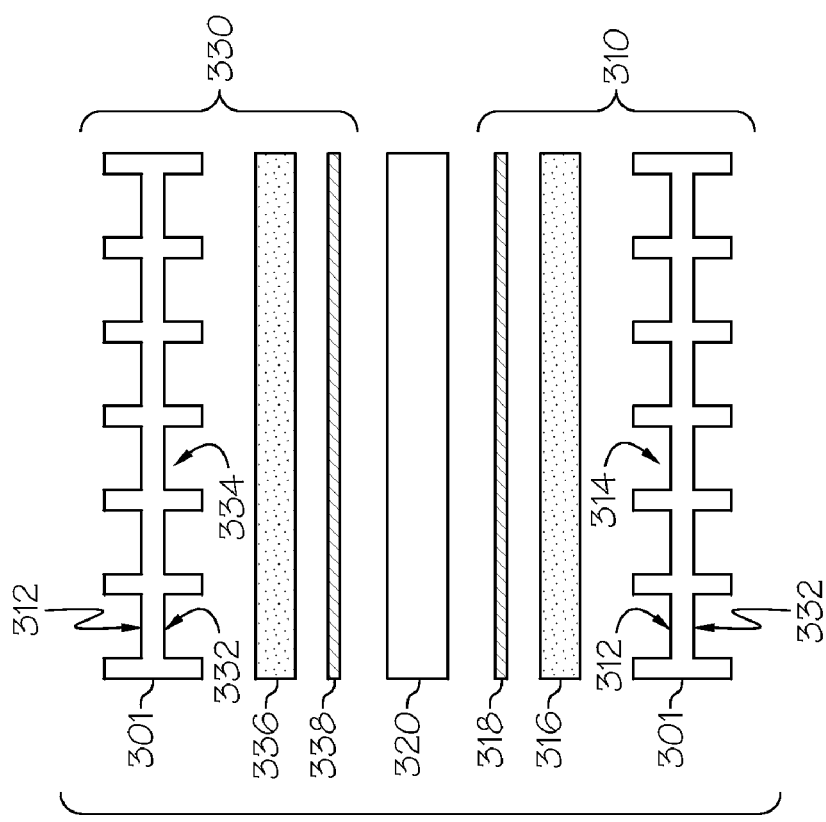
FIG. 2B
FIG. 2A

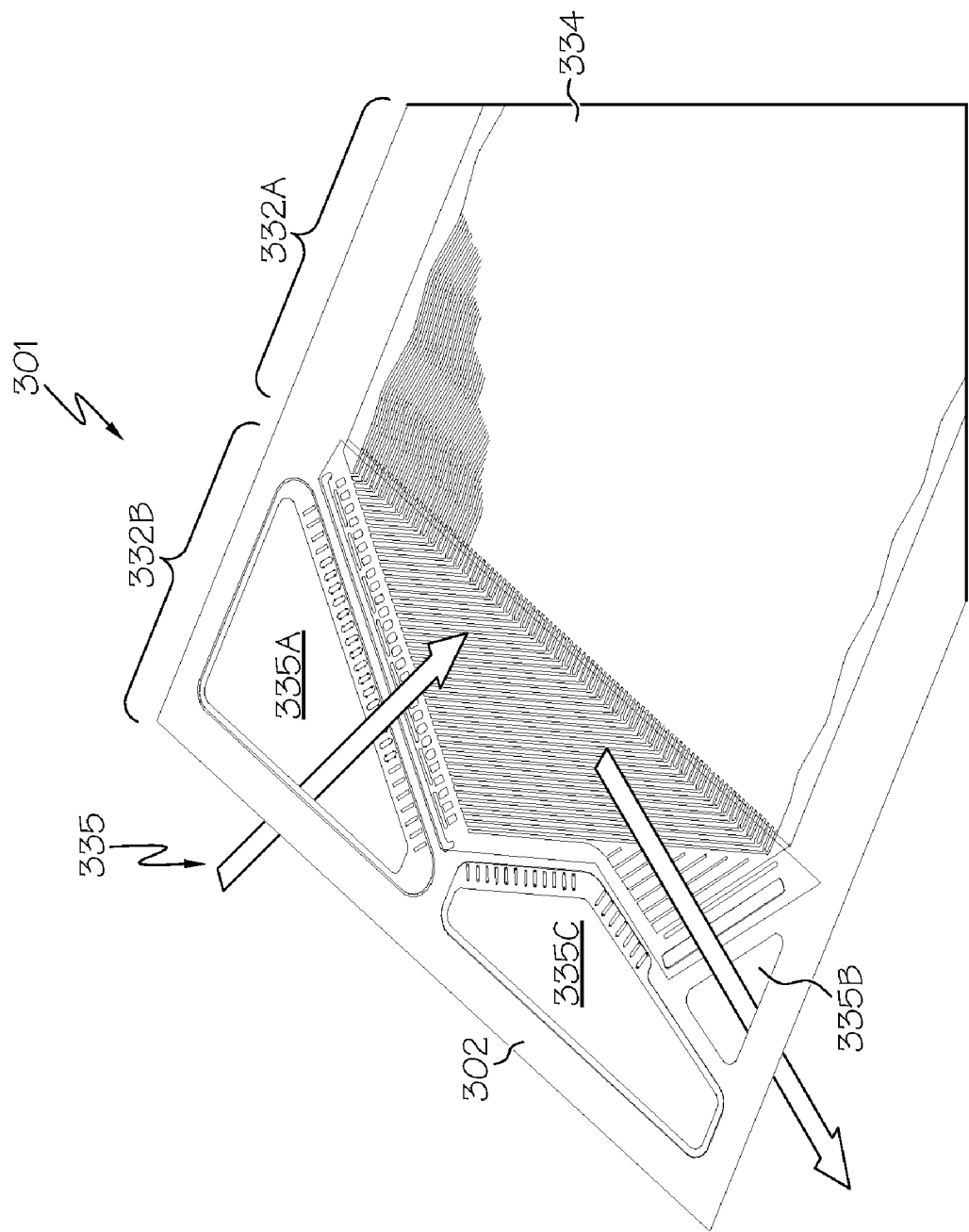

WATER REMOVAL SYSTEM FOR NON-REACTIVE REGIONS IN PEFMC STACKS

BACKGROUND OF THE INVENTION

The present invention relates generally to water management within a fuel cell, and more particularly to ways to remove water from moisture-rich reactant flowpaths.

In many fuel cell systems, hydrogen or a hydrogen-rich gas is supplied through a flowpath to the anode side of a fuel cell while oxygen (such as in the form of atmospheric oxygen) is supplied through a separate flowpath to the cathode side of the fuel cell. An appropriate catalyst (for example, platinum) ionizes the hydrogen into a proton and electron on the anode side such that upon subsequent combination of the proton with oxygen and the electrons at the cathode side, electric current is produced with high temperature water vapor as a reaction byproduct.

In one form of fuel cell, called the proton exchange membrane fuel cell (PEMFC), an electrolyte in the form of a ionomer membrane is assembled between electrodes known as an anode and cathode. This layered structure is commonly referred to as a membrane electrode assembly (MEA), and is further layered between bipolar plates to allow communication with the respective anode and cathode reactants. The bipolar plates separating each MEA include channels formed in opposite surfaces. These channels act as conduit to convey hydrogen and oxygen reactant streams to the respective anode and cathode of the MEA. In addition to providing flowfield channels to act as reactant flowpaths, the bipolar plates can be made electrically conductive to act as current collectors for the generated electricity in the regions of the plates that are adjacent electrochemically active area of the MEA. Layers of porous support material and catalyst are situated between the channels of the plates and each side of the membrane to facilitate the necessary electrochemical reactions.

In a PEMFC stack, the water produced in the oxygen reduction reaction at the cathode is removed through the flowfield channels formed in the bipolar plates. The highest concentration of water exists at or near the outlet regions of the plates, due in part to low gas velocities that reduce the purging quality of the gas. Under such conditions, the likelihood of liquid water stagnating and accumulating in the exit region of the plate is greater, which is undesirable in that by plugging up the flow channels with water droplets, it adversely impacts stack voltage stability. In addition, stack durability is impacted, as flow blockage entailed by such droplets can cause localized hydrogen starvation and related carbon corrosion. Furthermore, the accumulation of water that is exposed to sub-freezing conditions for prolonged periods leads to ice buildup within the flowfield channels, thereby inhibiting operation. Present methods of avoiding this condition include maintaining a high gas velocity to purge the excess liquid from the stack flowpath, and operating the stack under extremely dry conditions. The first is disadvantageous in that it necessitates additional power consumption to operate a compressor or related pumping device, while the second is disadvantageous in that it could upset the delicate humidity balance required in the ionomer. It is therefore desirable that a PEMFC stack be configured to reduce or eliminate the buildup of excess water in the flowfield channels of the bipolar plates without the disadvantages mentioned above.

BRIEF SUMMARY OF THE INVENTION

These desires are met by the present invention, wherein a PEMFC assembly and a method of operating the assembly that incorporates the features discussed below is disclosed. In accordance with a first aspect of the present invention, a fuel cell assembly with a water transport (also called redistribution) device is disclosed. The assembly includes numerous membrane electrode assemblies and plates, each of which are disposed between individual membrane electrode assemblies. Each plate has a reactant flowpath on one or both of its sides, thereby placing the reactant flowpath in fluid communication with a facing anode or cathode. Each of the reactant flowpaths (which are in the form of channels) corresponds to an active region and an inactive region. The active region, through cooperation with an appropriate part of the membrane electrode assembly, facilitates an electrochemical reaction involving at least one of the reactants and a catalyst placed on the corresponding anode or cathode. By contrast, the inactive region has no catalyst and therefore does not facilitate an electrochemical reaction. The water transport device is made up of a hydrophilic member that promotes the capillary action of water away from the moisture-rich fluid, making it particularly well-suited to the removal of liquid water from the fluid that passes through the channels. In the present context, a moisture-rich fluid is one that contains an excess of moisture in the form of liquid, vapor or a combination of the two, whereas a moisture-deficient fluid is one that has a lower moisture content than the moisture-rich fluid.

Optionally, the plates may be made form numerous bipolar plates comprising reactant flowpaths on each side thereof such that one side of the each plate is in fluid communication with the anode of one of the membrane electrode assemblies and another side is in fluid communication with the cathode of another of the membrane electrode assemblies. For example, one side of the bipolar plate may be made from numerous wet side reactant channels and opposite dry side reactant channels. The dry side reactant channels are in fluid communication with an opposite one of the anode and cathode from the wet side reactant channels via a water-permeable membrane. The water transport device may exist in various constructions. In one, a multilayered approach may be used. For example, a porous hydrophilic member and another porous member may form substrates that surround a water-permeable membrane such that water in the moisture-rich flowpath may pass through the hydrophilic member, membrane and porous substrate and into the moisture-deficient flowpath.

In another construction, water that collects on the hydrophilic member can be redistributed within the moisture-rich flowpath away from the fluid outlet. Such a construction does not require a backing membrane or opposing side porous member. In yet another construction, the water redistribution device defines a layered structure made up of a water-impermeable layer (also referred to as a sub-gasket) disposed against a surface of the hydrophilic member. For example, the sub-gasket may be made from a thin layer of plastic used to protect the membrane. By having the water transport device included with a substantially non-permeable backing layer, any water absorbed in the hydrophilic member remains there. Thus, in one form, the hydrophilic material can be configured as a porous member to allow absorption, wicking and redistribution to interconnected channels, while in another, the hydrophilic material can be configured as a coating that acts as a wetting agent to promote the formation of thin water films rather than bulky water slugs within a coated channel. In the first of these latter two constructions, the assembly may further include conduit configured to redistribute the water absorbed in the hydrophilic member throughout a substantially planar region defined by the hydrophilic member such that the water that collects on the hydrophilic member can be redistributed within the plurality of wet side reactant channels. With no water transfer through the sub-gasket or related non-permeable membrane, the water in the porous hydrophilic redistribution device will eventually be evaporated during a drier operating condition. As such, the device keeps channels open for gas transport. The second of these two latter configurations promotes distribution of water within each of the channels, thereby reducing the likelihood of water droplet blockage of each treated channel.

Regardless of which of the constructions above are used, the hydrogen-bearing reactant is fed to the plurality of dry side reactant channels through an anode header, and the oxygen-bearing reactant is fed to the plurality of wet side reactant channels through a cathode header, each of the headers formed in the bipolar plate. Likewise, In a more particular embodiment of this construction, the moisture-deficient (i.e., dry side) reactant channels and moisture-rich (i.e., wet side) reactant channels are placed in counterflow relationship with one another.

As stated above, the hydrophilic member is water-permeable. As stated above, in one form of its use, it can be disposed against a water permeable membrane, while in another against an impermeable layer (i.e., sub-gasket) with or without the membrane on the other side. In addition, the hydrophilic member may be made up of porous polymers, nonconductive fiber papers, carbon papers treated with a surfactant or related materials.

In another option, the water transport device can be configured such that is attached directly to the water permeable membrane, thereby removing the need for the sub-gasket when placed within the frame of a bipolar plate. In another option, the moisture-rich and moisture-deficient channels may be a cathode flowpath and an anode flowpath, respectively, which may be in either counterflow or co-flow relationship with one another. To promote additional lateral wicking of absorbed water, the hydrophilic layer can be extended beyond the individual channels of the anode or cathode flowpaths and into the manifold. For example, the hydrophilic member may extend in an in-plane dimension (specifically, along the longer lateral dimension that through the shorter through-the-thickness dimension) beyond the inactive region. In yet another option, the fuel cell may be incorporated as part of a system that serves as a source of motive power for a vehicle. Examples of such vehicles include (but are not limited to) automobiles, trucks, buses, aircraft, watercraft, spacecraft and motorcycles.

According to another aspect of the invention, a fuel cell assembly includes numerous membrane electrode assemblies and bipolar plates cooperative with the assemblies to define a fuel cell stack, and a hydrophilic water transport device configured to redistribute liquid water collecting in portions of the stack. The bipolar plates have anode and cathode flowpaths, where one tends to be moisture-rich relative to the other. At least the moisture-rich flowpath is subdivided into an active region and an inactive region, where the former facilitates a electrochemical reaction by its inclusion of catalysts in facing fluid contact with the respective anode or cathode, while the latter does not promote a electrochemical reaction by virtue of the catalyst being replaced by a hydrophilic member. Together the membrane electrode assemblies and the bipolar plates define a fuel cell stack, the bipolar plates comprising reactant flowpaths on opposing sides thereof such that one of the reactant flowpaths is in fluid communication with the anode while the other of the reactant flowpaths is in fluid communication with the cathode.

Optionally, the hydrophilic water transport device comprises a cathode flowpath that is in fluid communication with the cathode, an anode flowpath that is in fluid communication with the anode and a membrane disposed between the anode and cathode flowpaths. The membrane may be moisture-permeable such that at least a portion of the water collecting in the inactive region passes through the moisture-permeable membrane and into cooperation with an opposite one of the anode and cathode flowpaths. At least one side of the moisture-permeable membrane may be substantially covered with a porous hydrophilic material disposed on it. In another form, the membrane may not be moisture-permeable such that the liquid water wets a substantial entirety of the porous hydrophilic material in the fluid outlet. As stated before, in this configuration, with no water transfer through the membrane, the water in the porous hydrophilic redistribution device will eventually be evaporated during a drier portion of the operating cycle. In one form, the hydrophilic material may be in the form of a member that is capable of absorbing water therein, as well as allowing the water to wick laterally through the material so that it can be distributed in adjacent channels. In another form, the hydrophilic material may be a coating that acts as a wetting agent. While not able to absorb water, it does allow tin water films to form on the coated surface, thereby avoiding channel blockage due to large water droplet formation. Hydrophilic treatment using a wetting agent may include treating the substantial entirety of surfaces of a flow channel, as well as treating the surface of a sub-gasket or related water-impermeable membrane.

According to another aspect of the invention, a method of reducing water blockage in a fuel cell is disclosed. Reactants combined in an electrochemical conversion reaction produce an electric current and a water-containing byproduct; by conveying at least some of the water through a water transport device that is coupled to the fuel cell, the amount of water in this byproduct may be reduced. The water transport device is in fluid communication with a moisture-rich flowpath that is used to carry a fluid containing one of the anode and cathode reactants through the fuel cell. The method includes delivering a first reactant through the anode flowpath and a second reactant through the cathode flowpath. As stated above, at least one of the anode and cathode flowpaths comprise an active region and an inactive region, where the active region is that portion that is in a substantially facing relationship with a respective one of the anode or the cathode. The method further includes combining the first and second reactants in an electrochemical conversion reaction in the fuel cell such that a fluid passing through the active region and containing the first or second reactant experiences an increased water content, then transporting the fluid containing the increased water content through a hydrophilic member disposed in the inactive region and then redistributing at least some of the increased water content away from the flowpath and into the hydrophilic member.

Optionally, the anode and cathode flowpaths are disposed on opposite sides of a bipolar plate that is disposed between adjacent the fuel cells in a fuel cell stack. In addition, the hydrophilic member may be made from a first porous substrate through which the absorbed water may pass. Furthermore, the hydrophilic member is part of a water transport device that fluidly connects the anode and cathode flowpaths. In one form, the water transport device defines a layered structure that may include (in addition to the aforementioned hydrophilic member) a water-permeable membrane disposed against a surface of the hydrophilic member and a second porous substrate that is disposed against another surface of the water-permeable membrane. The second porous substrate may form part of the flowpath that does not contain the increased water content. In this way, a portion of the increased water content that passes through the hydrophilic member further passes through the water-permeable membrane and the second porous substrate and into the lower moisture flowpath, thereby facilitating humidity transfer from the moisture-rich flowpath to the moisture-deficient flowpath.

In another option, the anode and cathode flowpaths are disposed on opposite sides of a bipolar plate that is disposed between adjacent the fuel cells in a fuel cell stack. In addition, the hydrophilic member may be made from a first porous substrate through which the absorbed water may pass. A perforated layer can be attached between the porous substrates on the moisture rich and moisture deficient side of the membrane allowing water transport throughout. Such perforated layer mechanically protects the membrane material, while simultaneously reducing gas crossover between anode and cathode.

In still another option, the hydrophilic member is part of a liquid water transport device that defines a layered structure that also includes a water-impermeable layer disposed between the surface of the hydrophilic member and the water permeable membrane. In such a construction, the increased water content that is absorbed in the hydrophilic member remains there, rather than passing entirely through the water permeable membrane and into the opposite fluid flowpath. In this configuration the hydrophilic member wicks water away from the moisture-rich flow channel such that the water removed is contained within the hydrophilic member. Water contained in the hydrophilic member is dispersed laterally, thereby increasing the surface area of the water. The water is subsequently removed by evaporation as relative humidity changes allow.

In yet another option, the hydrophilic member is extended into the outlet manifold of the fuel cell stack. This can be used with or without the membrane transfer options discussed above. By extending the hydrophilic member into the manifold, the liquid water films that formed therein are wicked laterally into the hydrophilic member. Once these films are wicked into the hydrophilic member they will no longer block flow at the outlet, thereby reducing the likelihood of flow maldistribution.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which:

FIG. 2A shows an exploded view of a single fuel cell with anode, cathode, membrane, catalyst, diffusion layer and surrounding bipolar plates;

FIG. 2B shows a perspective view of a single assembled fuel cell where the anode, cathode and membrane are arranged relative to bipolar plates to define hydrogen and oxygen input flow channels, as well as water vapor outlet flow channels;

FIG. 3 shows a perspective view of a cathode side of a bipolar plate according to an embodiment of the present invention, showing both an active region and an inactive region, as well as a reactant header with flowpath manifolds;

DETAILED DESCRIPTION OF THE PREFERRED EMBODIMENTS

Figure 1:
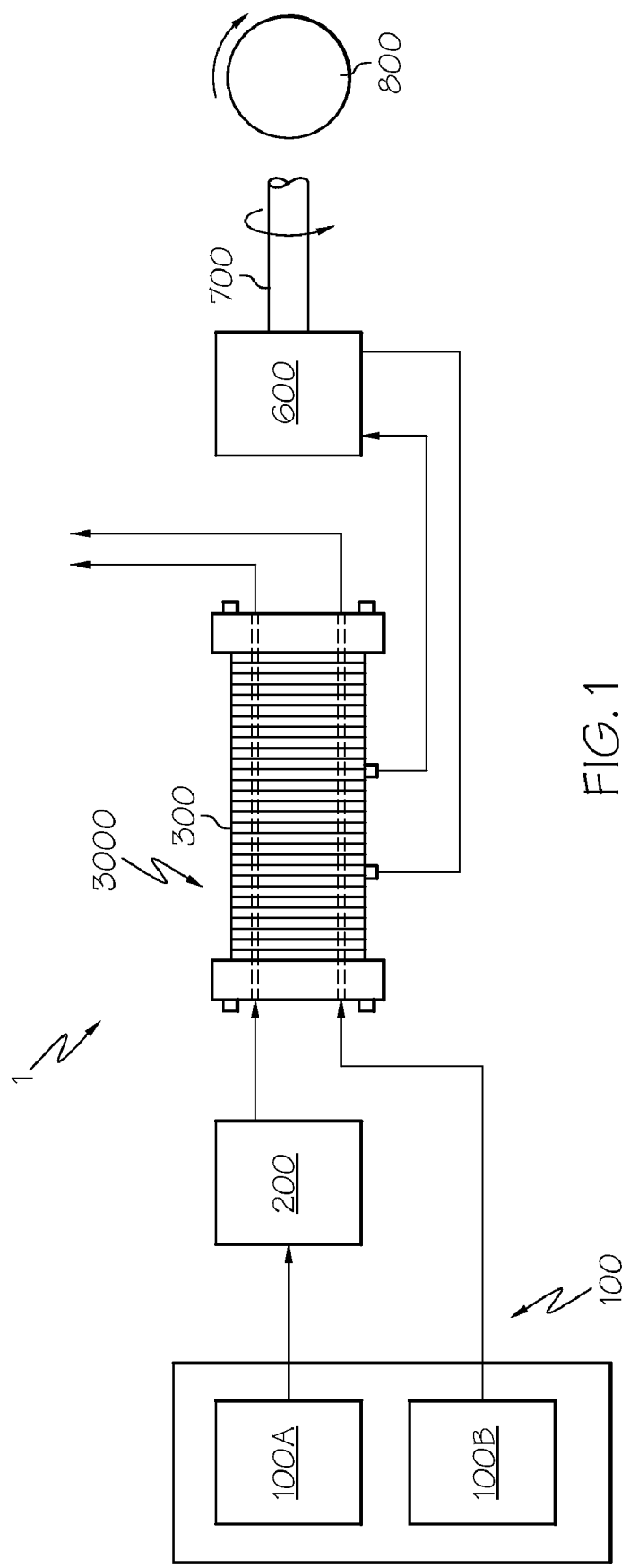
FIG. 1 shows a block diagram of a fuel cell system configured for vehicular application.
Figure 5:
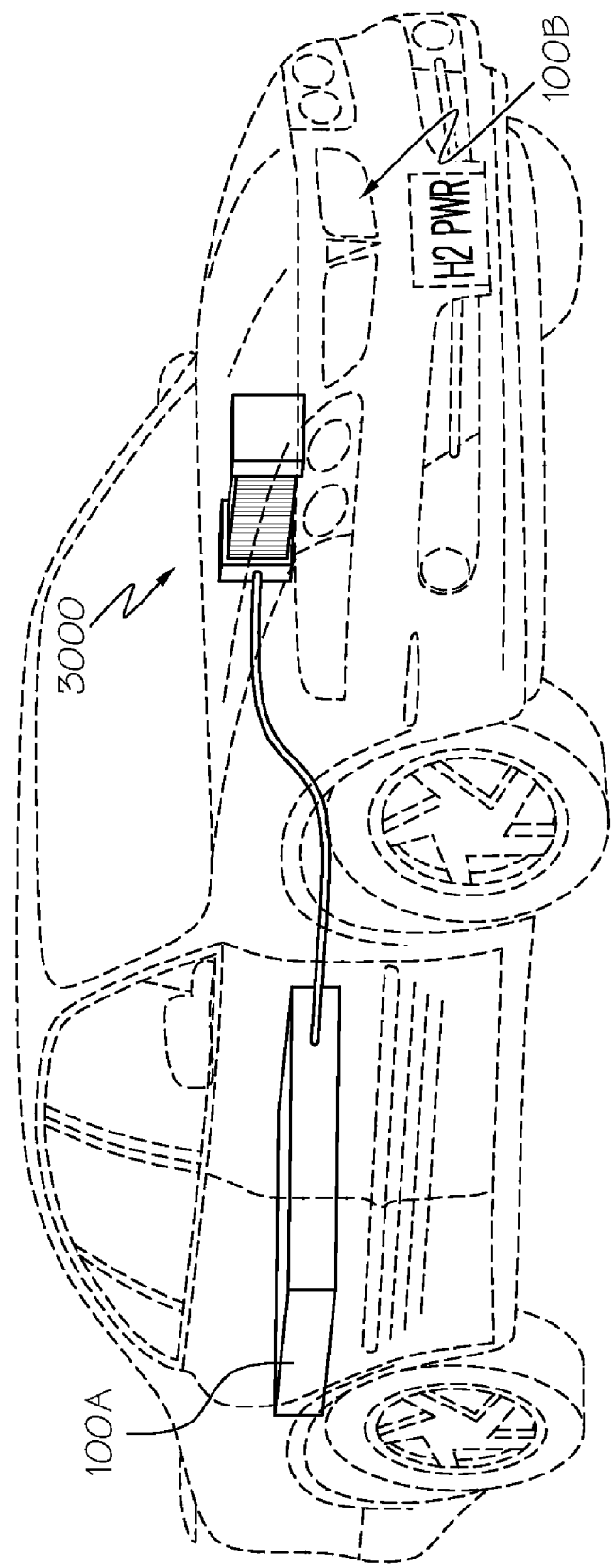
FIG. 5 shows a vehicle employing the fuel cell system of the present invention.

Referring initially to FIGS. 1, 2A, 2B and 5, the major components of a mobile fuel cell system 1 according to the present invention (FIG. 1), as well as a representative fuel cell (FIGS. 2A and 2B) and fuel cell stack (also in FIG. 1) and placement of a fuel cell system into an automotive application (FIG. 5) are shown. Referring with particularity to FIG. 1, the system 1 includes a reactant delivery system 100 (made up of fuel source 100A and oxygen source 100B), optional fuel processing system 200 (in situations where relatively pure hydrogen is not provided by fuel source 100A), fuel cell stack 3000 made up of one or more fuel cells 300, one or more optional energy storage devices 600, a drivetrain 700 and one or more motive devices 800, shown notionally as a wheel. Optionally, a compressor (not shown) may be used in configurations where one or both of the fuel or oxygen sources 100A, 100B are not supplied via pressurized tank or related container. Referring with particularity to FIG. 5, the use of a stack 3000 is especially relevant to vehicular and related applications, where significant increases in voltage, current or both may be required to provide the necessary motive power. While the present system 1 is shown for mobile (such as vehicular) applications, it will be appreciated by those skilled in the art that the use of the fuel cell stack 3000 and individual fuel cells 300 and ancillary equipment is equally applicable to stationary applications.

The optional fuel processing system 200 may be incorporated to convert a raw fuel, such as methanol into hydrogen or hydrogen-rich fuel for use in fuel cell 300; otherwise, in configurations where the fuel source 100A is already supplying substantially pure hydrogen, the fuel processing system 200 may not be required. The optional energy storage devices 600 can be in the form of one or more batteries, capacitors, electricity converters, or even a motor to convert the electric current coming from the fuel cell 300 into mechanical power such as rotating shaft power that can be used to operate drivetrain 700 and one or more motive devices 800.

Referring with particularity to FIGS. 2A and 2B, each fuel cell 300 is of layered construction, and includes an anode 310, cathode 330, and an electrolyte layer 320 disposed between anode 310 and cathode 330, where collectively, the anode 310, electrolyte layer 320 and cathode 330 are referred to as the MEA. Bipolar plates 301 (also referred to simply as "plates") are placed between successive MEAs for fluid (and optionally, coolant) routing. Upon lamination or other suitable construction, the respective sides 312 and 332 of the bipolar plate 301, along with corresponding anode and cathode fluid channels 314, 334, cooperate with a porous diffusion media 316, 336 and layer of catalyst 318, 338 to cooperate with the respective anode 310 and cathode 330 for the electrochemical conversion of hydrogen and oxygen. In the present context, the term "laminate" and its variants merely refers to the generally sandwich-like construction between the various fuel cell components; it is not meant to imply that conventional laminate bonding or adhesive approaches are required in order to ensure the continuity of such structure. Oxygen (possibly in the form of air) enters cathode fluid channels 334 that are formed on one side of the bipolar plate, while hydrogen enters the anode fluid channels 314 that are formed on the other side of the bipolar plate. Of the two reactant-bearing fluid channels 314, 334, the one that conveys a moisture-rich fluid is referred to as the wet side reactant channel, while the one that conveys a moisture-depleted (or moisture-deficient) fluid is referred to as the dry side reactant channel. It will be appreciated that while an anode flowpath is generally drier than a cathode flowpath, there may be operating conditions where the anode flowpath has higher moisture content than the cathode flowpath. While the version shown in the figure depicts, for conceptual convenience, two cutaway halves of two separate bipolar plates with one half of one plate facing generally out of the page and one half of the other plate facing generally into the page of FIG. 2B, it will be appreciated by those skilled in the fuel cell art that such cutaway representation possesses comparable functionality to that of a single bipolar plate.

Referring next to FIG. 3, various features of a cathode side 332 of the bipolar plate 301 with a partial view of the various cathode fluid channels 334 formed in such cathode side 332 are shown. The cathode side 332 includes an active region 332A and an inactive region 332B that together define fluidly continuous conduit, piping or related fluid channels 334 through which the reactant passes. The active region 332A is that portion of the cathode side 332 that would be overlaid with a catalyst-loaded diffusion media (such as diffusion media 336 of FIG. 2A) such that the electrochemical combination of the reactants across the various MEAs produces electron flow, heat and water vapor. The diffusion layer (also known as a diffusion media as shown in FIG. 2A) 336 is formed of a generally porous electrode substrate upon which a catalyst layer 338 (also as shown in FIG. 2) is placed. While the present view depicts the cathode side 332 of the bipolar plate, it will be appreciated that the opposing anode side is equally applicable to the discussion of how the bipolar plate 301 of the present invention is constructed and operates. In the present context, the terms "conduit", "flowpath", "flowfield channel", "flow channel" and their variants are used generally to encompass the various forms of fluid-conveying channels for reactants, coolant or related fluids. As is understood by those skilled in the art, the diffusion media 336 making up cathode 330 mates with one surface of plate 301, while the diffusion media 316 making up the anode 310 mates with the other opposing surface.

By contrast to the active region 332A, the inactive region 332B is that portion that does not include catalyst (and is therefore not capable of the electrochemical reaction that takes place in the active region 332A), but is instead used to provide water transport capability. In one configuration, water is transported laterally and then diffuses between the moisture-rich and moisture-deficient flowpaths that are used to carry reactants or byproducts of the electrochemical reaction. In the present context, a fluid is moisture-rich when it contains a relative abundance of moisture (such as in the form of water droplets or a high relative humidity), and is moisture-deficient when it has a relatively low humidity (such as around fifty percent relative humidity, for example). As will be discussed in more detail below, the chief distinction of the inactive region 332B over that of the active region 332A is the use of a water transport device instead of an electrode disposed against the respective anode 310 or cathode 330.

A frame 302 is used to define the outer boundaries and structural backbone of the bipolar plate 301, and may include an upstanding lip or flange to increase plate sealing, rigidity or the like. The header 335 forms a portion of inactive region 332B and defines flow manifolds 335A, 335B and 335C therein to allow contact of one or more fluids with the water transport device (shown and described below in conjunction with FIG. 4). Manifold 335C is an optional coolant manifold that is fluidly coupled to a coolant flowpath (not shown).

Figure 4:
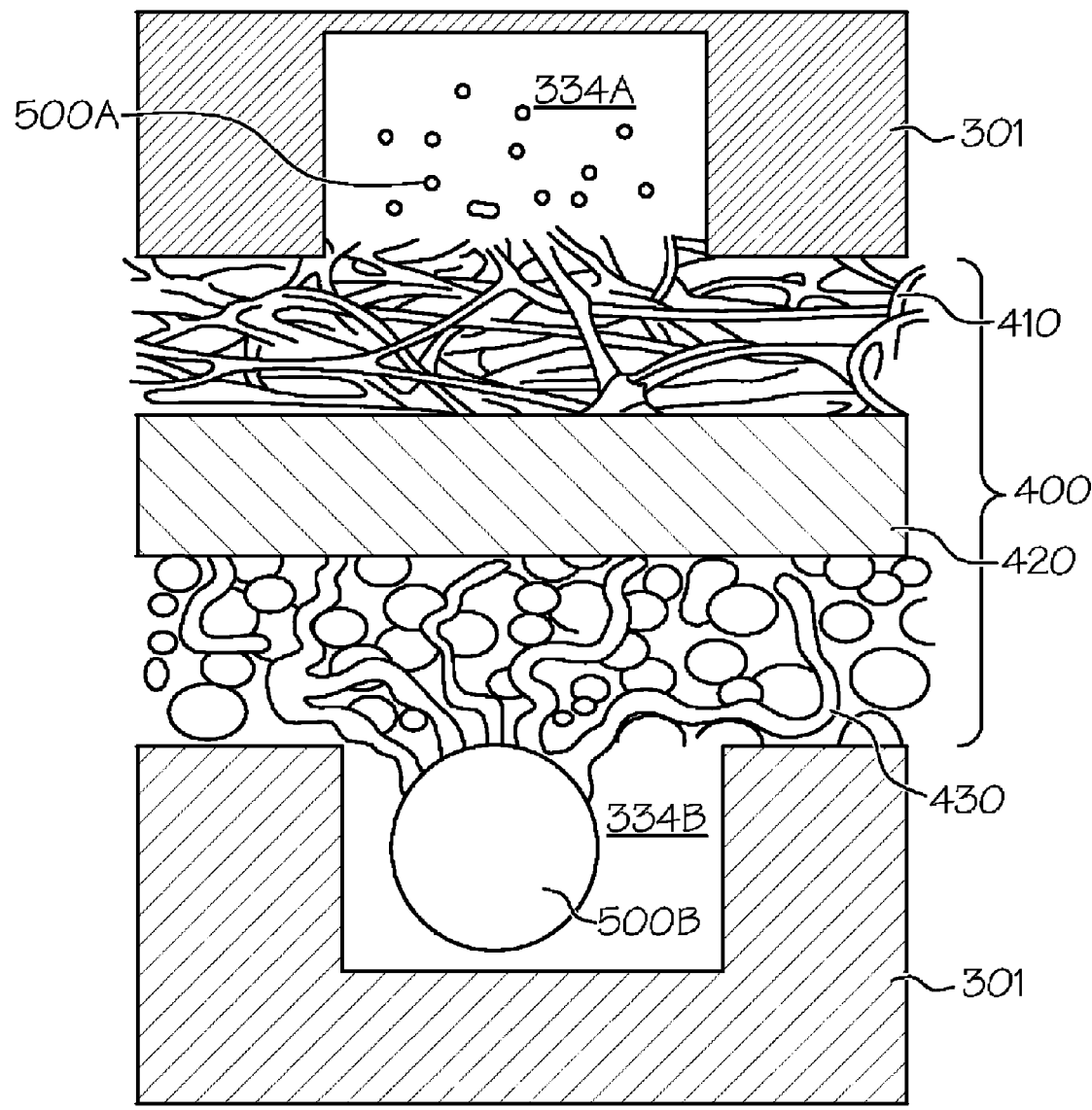
FIG. 4 shows a cross sectional view within the inactive region of the bipolar plate of FIG. 3, highlighting the water removal system.

Referring next to FIG. 4, a water transport device 400 used to convey water from a moisture-rich fluid channels 334B to a low moisture (i.e., moisture-deficient) fluid channels 334A, is shown. The cross sectional view shows the stacked nature of respective lower and upper halves of two facing bipolar plates 301 with the water transport device 400 situated between them. It will be appreciated that if this were a cross sectional view of the active region 332A, catalysts in conjunction with the MEA would be shown. The device 400 includes a water-permeable membrane 420 surrounded on opposite sides by a first porous diffusion media 410 and a second porous diffusion media 430, where the second media 430 differs from the first 410 by the inclusion or attachment of hydrophilic material to the diffusion media 430. As shown, the entirety of the second media 430 makes up a hydrophilic member (also referred to as a hydrophilic layer, material, coating or construction) to promote wicking or other related water-transport mechanisms. Thus, the second porous diffusion media 430 is inherently hydrophilic throughout it thickness by virtue of material properties or treatments. In another configuration, hydrophilic treatments could be in the form of a layer of material that is deposited on the second porous diffusion media 430 or deposited on the surfaces of the moisture-rich fluid channel 334B to render them hydrophilic.

The first porous diffusion media 410 is in fluid communication with moisture-deficient fluid channel 334A, while the second porous diffusion media 430 is in fluid communication with (and makes up part of) moisture-rich fluid channel 334B. The second porous diffusion media 430 is exposed to moisture (presently shown in the form of liquid water 500 in the form of a droplet 500B) that flows through the moisture-rich fluid channel 334B. By way of example, the water droplet 500B may form as a by-product of the electrochemical reaction between hydrogen introduced into the anode 310 and oxygen introduced into the cathode 330. The driving force to push water from the second porous diffusion media 430 to the first porous diffusion media 410 is based at least in part on a concentration gradient existing across the membrane 420. The hydrophilic nature of the second porous diffusion media 430 on the moisture-rich side serves two beneficial functions. First, it pulls liquid water from the moisture-rich fluid channel 334B, thereby reducing the likelihood of blockage due to the water. Second, by holding liquid water against the membrane 420 it provides a more consistent supply of water to the moisture-deficient fluid channel 334A, thereby acting as a water buffer. This may be especially beneficial in situations where membrane materials show higher performance when liquid water is in contact with the side of the membrane that faces (i.e., is adjacent) the moisture-rich fluid channel 334B. While the water transport unit 400 works with a moisture-donating fluid in either the liquid or vapor form, membrane 420 generally works better when the water contained in the fluid is in liquid form. Moreover, the flexible porous construction of the second porous diffusion media 430 is such that any water trapped in the moisture-rich fluid channel 334B will wick to the layer during freeze conditions, which makes it resistant to freeze-thaw cycles. In one form, the two fluid channels 334A, 334B are in a counterflow relationship with one another such that the fluid in moisture-deficient fluid channel 334A enters with little or no humidity, and leaves with an increased level of humidity after having accepted water from the fluid in the moisture-rich fluid channel 334B. Although the water transport device 400 is shown in a generally stacked rectangular configuration, it will be appreciated that the membrane and porous diffusion media may be any of a variety of shapes. Theoretical calculations indicate that one one-hundredth of a cubic centimeter of liquid water per second can be removed (when the two fluid channels 334A and 334B are set up in counterflow arrangement) which corresponds to the entire volume of the outlet porous substrate being removed less than every thirty seconds.

Figure 6A:
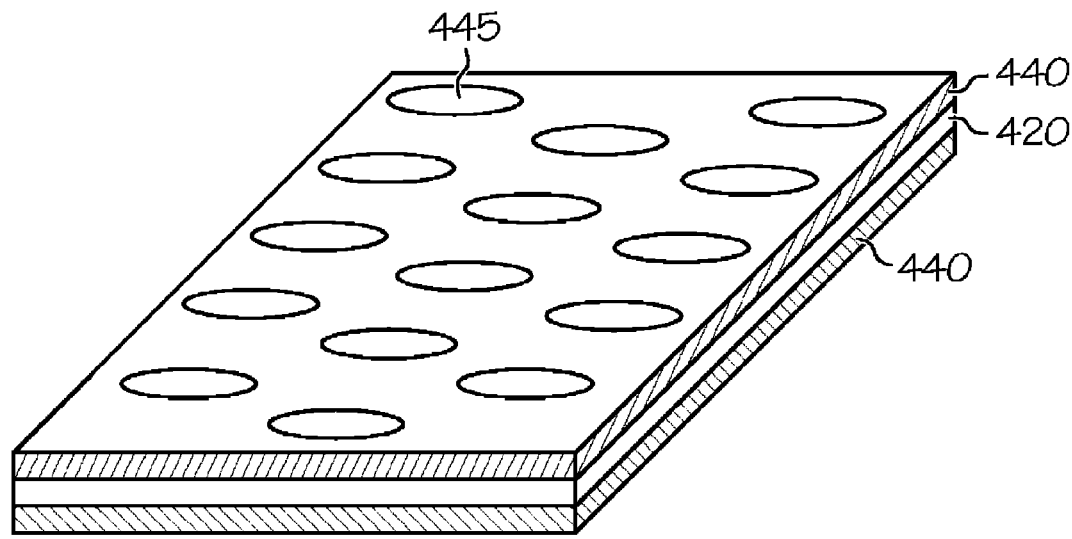
FIGS. 6A and 6B show the inclusion of a sub-gasket disposed around a membrane.
Figure 6B:
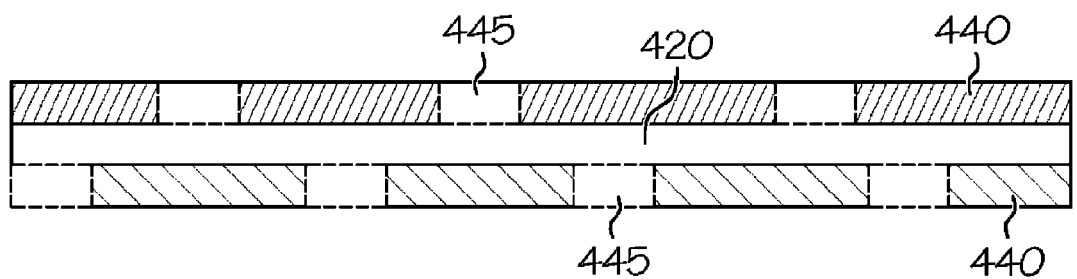

As stated before, the membrane 420 in the inactive region 332B can vary from that used in the active region 332A. The material thickness may also vary. One way such varying can be achieved is by employing a sub-gasket 440 between the active region 332A and the inactive region 332B. Referring next to FIGS. 6A and 6B, the sub-gasket 440 will protect the electrode edge and could be perforated in the inactive region 332B to allow water transfer, as well as mechanically support the membrane 420. The sub-gasket 440 is an impermeable layer (for example, a thin polymer) attached to the membrane to provide mechanical support and eliminate gas crossover. For an embodiment employing a membrane, the perforations can be achieved by apertures 445 in the figures. Although not shown, sub-gasket 440 may be free of apertures or related perforations. Referring with particularity to FIG. 6B, reduced gas crossover (specifically nitrogen diffusing from cathode to anode) is realized by staggering the perforation such that the holes on the anode are not aligned with the cathode. This provides an increase in diffusion length, thereby reducing the crossover rate.

Referring again to FIG. 4, the moisture-rich fluid channel 334B includes an inlet side and an outlet side, each fluidly coupled to a respective header (such as header 335). The hydrophilic character of the second porous diffusion media 430 that is adjacent the moisture-rich fluid channel 334B can be achieved through the use of various materials, including porous polymers (such as sintered polyethylene), nonconductive fiber papers (such as acrylic fiber paper), or carbon fiber paper treated with surfactant. On the evaporating inlet side, the contact angle of the porous substrate is much less important. This is so because this media should only handle vapor (rather than liquid), as water is evaporating from the membrane into the moisture-deficient channel through it. Surface properties are less important because the moisture deficient side generally doesn't handle water in liquid form. It should be noted that porous media 410 is optional, as it increases evaporation rate at the expense of adding thickness. Both of the porous media 410 and 430 are preferably rigid and exhibit similar stress-strain behavior. External humidification, which can be beneficial in improving system efficiency, may also be used.

Figure 7:
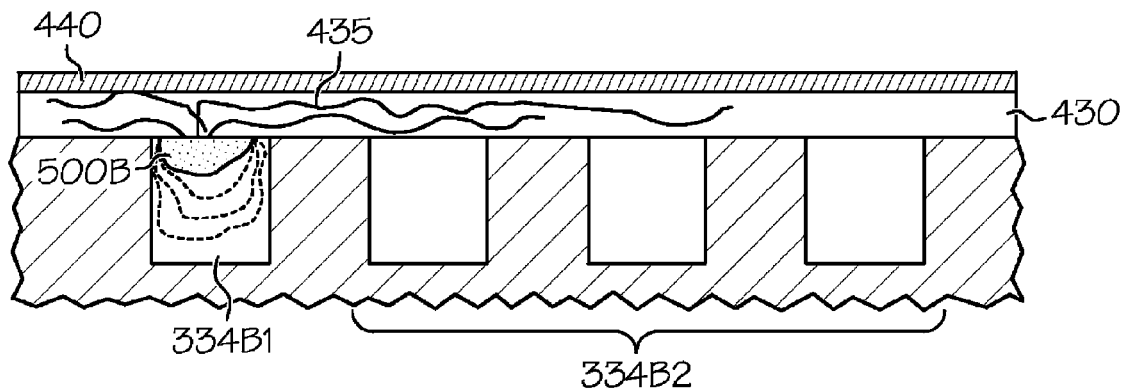
FIG. 7 shows another embodiment of the present invention, where a hydrophilic layer is placed between flow channels and a non-permeable membrane.

Referring next to FIG. 7 in conjunction with FIG. 4, in a second embodiment, the invention is simplified by not transferring water through the water transport device 400, instead redistributing it throughout and removing it from the various moisture-rich fluid channels 334B, which are presently shown as wet channels 334B1 and dry channels 334B2. In this embodiment, instead of membrane 420 of FIG. 4, a water-impermeable variant, such as sub-gasket 440, which does not permit water to pass through it from the moisture-rich fluid channel 334B to the moisture-deficient fluid channel 334A (not presently shown), could be used. Instead, liquid water will be absorbed from the moisture-rich fluid channel 334B and into the hydrophilic member 430, to be redistributed in-plane through a lateral flow mechanism 435. In such a form, sub-gasket 440 can act as a non-permeable anode or cathode backing layer to the porous hydrophilic member 430. The hydrophilic member allows excess water 500 (presently shown as a droplet 500B) to collect within and be distributed laterally throughout the layer formed by the member 430. By redistributing local outlet channel water slugs throughout the moisture-rich porous hydrophilic member 430 in the inactive region 332B, a significant amount of liquid water (approximately one blockage per channel) can be absorbed such that it is removed from the flowpath of the channel 334B. For example, in the figure, liquid water 500 passes from a wet channel 334B1 into the hydrophilic member 430 where through the lateral flow mechanism 435 inherent in the porous nature of the member 430, the water is redistributed with increased surface area such that the gas flow in channels 334B2 will readily evaporate the water at a rate much higher than if the water was not redistributed. This maintains an even flow distribution between all of the channels 334B. Since the average outlet relative humidity for typical stack operation is less than 100%, liquid water is only present at certain operating conditions for short periods of time; this liquid would be subsequently evaporated from the porous hydrophilic substrate during typical operation where exiting gas is less than saturated. In other words, by absorbing the liquid water into the porous media of the hydrophilic member 430, the evaporation or related removal rate is significantly increased such that individual channel stagnation is less likely to occur.

Figure 8:
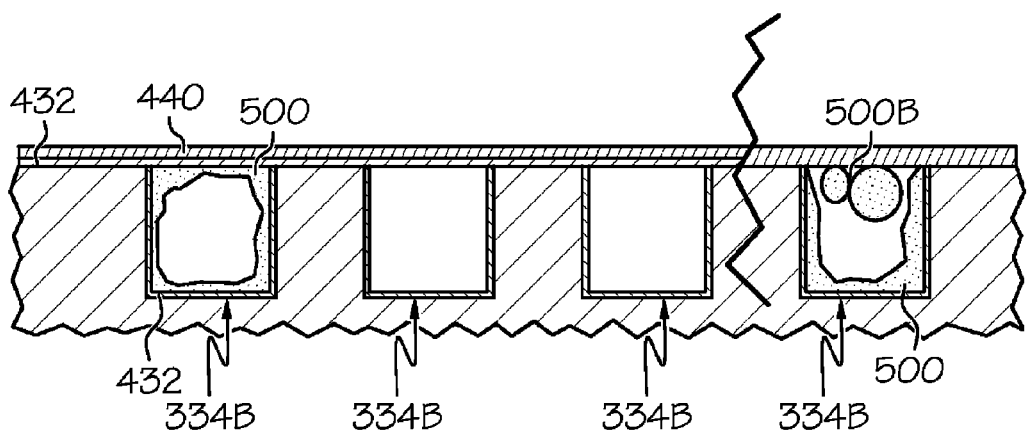
FIG. 8 shows another embodiment where the substantial entirety of the flow channels are covered with a hydrophilic material.

In a third embodiment, a hydrophilic material can be placed on the surfaces of the fluid channels 334B in the inactive region 332B (and the active region 332A too, in situations where the entire plate is dipped in a solution). Referring next to FIG. 8, only the moisture-rich fluid channels 334B are shown. As with the embodiment of FIG. 7, such a configuration allows the membrane 420 function of FIG. 4 to be done away with, thereby further simplifying the invention. In place of the membrane, a non-permeable sub-gasket 440 similar to that of FIG. 7 can be used to act as an anode or cathode fluid barrier. The inactive region 332B will remove liquid water more effectively if this surface is hydrophilic, especially if used in conjunction with a hydrophilically treated flow channel as shown, where the previously-described fluid channels 334B is coated with a thin layer of hydrophilic material 432 different from that of hydrophilic member 430. Thus, the hydrophilic character can be obtained by either an inherent material property or surface treatments. The key distinction between the hydrophilic member substrate 430 of the embodiment of FIG. 7 and the thin layer of hydrophilic material 432 of the embodiment of FIG. 8 is that the hydrophilic member substrate 430 absorbs liquid and hydrophilic material 432 does not, as the latter only provides a wettable surface. For this reason, the configurations of FIGS. 7 and 8 function differently from one another, as the embodiment of FIG. 8 can only redistribute water on the surface of the channel in which it resides, while in the embodiment of FIG. 7, water (shown in droplet form 500B) is absorbed from the channel 334B in it resides and is redistributed to other channels 334B2 throughout the inactive area. In this embodiment, all the channels and the gas flow in them will help to remove the water by evaporation and gas shear. Similar to the previously-discussed embodiment of FIG. 7, the nature of the sub-gasket 440 of the embodiment of FIG. 8 is such that water does not flow between the moisture-rich and moisture-deficient fluid channels 334B, 334A (of FIG. 4). With all three walls of the channels 334B hydrophilic and the forth wall formed by the surface of sub-gasket 440 that faces the channel 334B as shown on the left side of the break line of the figure, thin films of water 500 will form, thus allowing gas transport between adjacent channels. Without this feature of placing hydrophilic material on the surface of sub-gasket 440, there is a discontinuity of surface property between the walls of channel 334 and the sub-gasket 440, thereby requiring more gas velocity to remove the built-up water. Furthermore, the untreated wall of the channel 334B would accumulate water in droplet form 500B (as shown on the right side of the break line in FIG. 8) rather than as a film, which is undesirable, as the droplets 500B consume more channel cross section than when the water 500 is in film form. With an increased cross section blocked, a flow maldistribution could result. It will be clear from the present context that the part of the figure to the right of the break line is not part of the present embodiment, but is only shown to demonstrate what would happen to water with one of the channel surfaces left uncoated with hydrophilic material.

Figure 9:
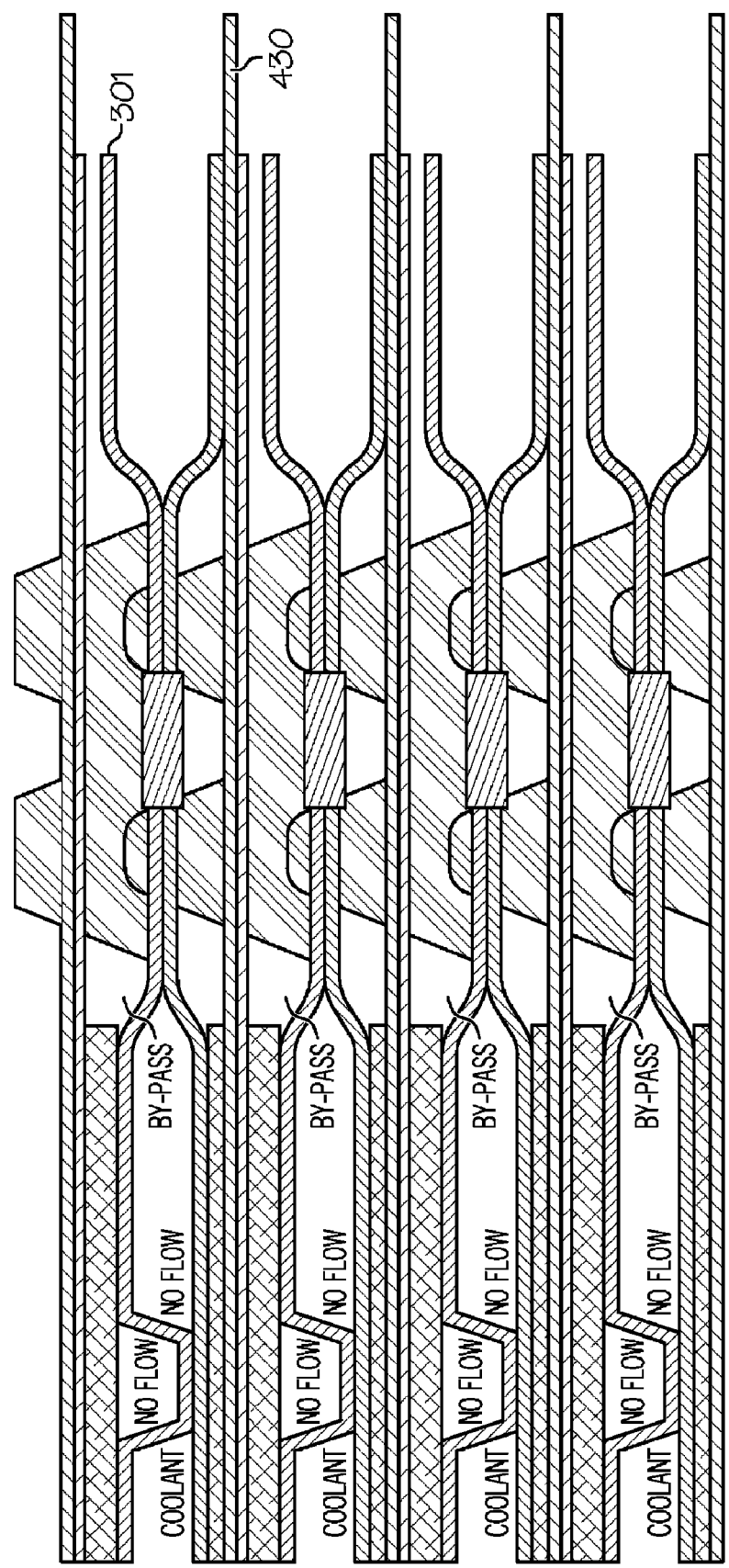
FIG. 9 shows how a layer of hydrophilic material can extend into a flowpath manifold.

Referring next to FIG. 9, the hydrophilic member 430 is extended beyond the edge of the bipolar plate 301 and into the flow manifold 335B. This can be used with or without the membrane transfer options discussed above. By extending the hydrophilic member 430 into the manifold 335B, the liquid water films that formed therein are wicked laterally into the hydrophilic member 430. Once these films are wicked into the hydrophilic member 430, they will no longer block flow at the outlet which could cause flow maldistribution otherwise. This eliminates blockages at the edge of plate 301 that could otherwise lead to durability and freeze start problems.

While certain representative embodiments and details have been shown for purposes of illustrating the invention, it will be apparent to those skilled in the art that various changes may be made without departing from the scope of the invention, which is defined in the appended claims.

What is claimed is:

1. A fuel cell assembly comprising:
    a plurality of membrane electrode assemblies, each comprising an anode configured to accept a hydrogen-bearing reactant, a cathode configured to accept an oxygen-bearing reactant, a proton-permeable electrolyte membrane disposed between said anode and said cathode, a catalyst layer on said anode side of said proton-permeable electrolyte membrane, and a catalyst layer on said cathode side of said proton-permeable electrolyte membrane, said catalyst layer on said anode side and said catalyst layer on said cathode layer having an area; and
    a plurality of plates each of which is disposed between a pair of said plurality of membrane electrode assemblies, said each plate defining a wet side reactant channel in fluid communication with a corresponding one of said anode or said cathode of an adjacently facing one of said membrane electrode assemblies, said wet side reactant channel comprising:
        an active region defined by said area of said catalyst layer of said anode side or said cathode side that facilitates a catalytic reaction of one of said reactants that passes therethrough; and
        an inactive region outside said active region where substantially no catalytic reaction takes place, said inactive region fluidly coupled to said active region; and
    a water transport device disposed in said inactive region and comprising a hydrophilic member that forms at least a portion of said wet side reactant channel such that upon passage of a fluid containing said one of said reactants through said wet side reactant channel, said hydrophilic member absorbs at least a portion of water present in said fluid.

2. The assembly of claim 1, wherein said plurality of plates comprises a plurality of bipolar plates, each of said plurality of bipolar plates having said wet side reactant channel disposed on one side thereof, and a dry side reactant channel disposed on the other side thereof, wherein said dry side reactant channel is in fluid communication with an opposite one of said anode and cathode from said wet side reactant channel.

3. The assembly of claim 2, wherein said hydrophilic member comprises a first porous substrate through which said absorbed water may pass.

4. The assembly of claim 3, wherein said water vapor transfer device further comprises a layered structure comprising:
    a water-permeable membrane disposed against a surface of said hydrophilic member that is away from said plurality of wet side reactant channels;
    a second porous substrate disposed against a surface of said water-permeable membrane that is away from said hydrophilic member; and
    a plurality of dry side reactant channels disposed against a surface of said second porous substrate that is away from said water-permeable membrane, said plurality of dry side reactants cooperative with said second porous substrate such that said water that passes through said hydrophilic member further passes through said water-permeable membrane and said second porous substrate and into said plurality of dry side reactant channels to increase the humidity of a fluid passing therethrough.

5. The assembly of claim 4, wherein said plurality of dry side reactant channels and said plurality of wet side reactant channels are in counterflow relationship with one another.

6. The assembly of claim 5, wherein said plurality of wet side reactant channels are in fluid communication with said cathode, and said plurality of dry side reactant channels are in fluid communication with said anode.

7. The assembly of claim 6, wherein said hydrogen-bearing reactant is fed to said plurality of dry side reactant channels through an anode header, and said oxygen-bearing reactant is fed to said plurality of wet side reactant channels through a cathode header, each of said headers formed in said bipolar plate.

8. The assembly of claim 1, wherein said hydrophilic member is selected from the group consisting of porous polymers, nonconductive fiber papers and carbon papers treated with a surfactant.

9. The assembly of claim 1, further comprising a water-impermeable layer disposed in said inactive region between said hydrophilic member and said electrolyte membrane.

10. The assembly of claim 9, wherein said water-impermeable layer is perforate.

11. The assembly of claim 2, wherein said water transport device defines a layered structure comprising a water-impermeable layer disposed against a surface of said hydrophilic member that is away from said plurality of wet side reactant channels such that said water absorbed in said hydrophilic member remains therein.

12. The assembly of claim 11, further comprising conduit configured to redistribute said water absorbed in said hydrophilic member throughout a substantially planar region defined by said hydrophilic member such that said water that collects in said hydrophilic member can be redistributed laterally within said plurality of wet side reactant channels.

13. The assembly of claim 2, wherein said hydrophilic member comprises a hydrophilic surface formed on all of the surfaces that define said plurality of wet side reactant channels disposed on said bipolar plates.

14. The assembly of claim 1, wherein said hydrophilic layer extends along an in-plane dimension farther than said inactive region of said plurality of plates.

15. A vehicle comprising the assembly of claim 1, wherein said fuel cell assembly serves as a source of motive power for said vehicle.

16. A fuel cell assembly comprising:
a plurality of membrane electrode assemblies each comprising an anode configured to accept a hydrogen-bearing reactant, a cathode configured to accept an oxygen-bearing reactant, a proton-permeable electrolyte disposed between said anode and said cathode, a catalyst layer on said anode side of said proton-permeable electrolyte membrane, and a catalyst layer on said cathode side of said proton-permeable electrolyte membrane, said catalyst layer on said anode side and said catalyst layer on said cathode layer having an area;
a plurality of bipolar plates alternately disposed with said membrane electrode assemblies such that together said membrane electrode assemblies and said bipolar plates define a fuel cell stack, said bipolar plates comprising reactant flowpaths on opposing sides thereof such that said reactant flowpaths on one side of said bipolar plate can convey a relatively moisture-rich fluid that has passed in fluid communication with either of said anode and said cathode, while said reactant flowpaths on the opposing side of said bipolar plate can convey a relatively moisture-deficient fluid that has passed in fluid communication with the other of said cathode and said anode, a portion of each of said reactant flowpaths defining an active region and a portion of each of said reactant flowpaths defining an inactive region, said active region defined by said area of said catalyst layer of said anode side or said cathode side to facilitate a catalytic reaction involving one of said reactants, said inactive region outside said active region where substantially no catalytic reaction takes place and wherein said inactive region comprises a fluid inlet in fluid communication with said active region and a fluid outlet in fluid communication with said fluid inlet; and
a hydrophilic water transport device fluidly coupled to said inactive region and configured to redistribute liquid water collecting in said inactive region.

17. The assembly of claim 16, wherein said hydrophilic water transport device further comprises a moisture-permeable membrane disposed between a pair of porous substrates, one of said pair of porous substrates disposed against said reactant flowpaths that can convey said relatively moisture-rich fluid and the other of said pair of porous substrates said reactant flowpaths that can convey said relatively moisture-deficient fluid, wherein said one of said porous substrates comprises hydrophilic treatment and forms a portion of said reactant flowpaths that can convey said relatively moisture-rich fluid such that moisture in said relatively moisture-rich fluid passes through said membrane and said pair of porous substrates and into said reactant flowpaths that can convey said relatively moisture-deficient fluid.

18. The assembly of claim 16, wherein said hydrophilic water transport device further comprises a water-impermeable membrane disposed against a layer of hydrophilic material that is disposed against said reactant flowpaths that can convey said relatively moisture-rich fluid such that said redistributed liquid water wets said layer of hydrophilic material.

19. The assembly of claim 16, wherein said hydrophilic water transport device further comprises a water-impermeable membrane disposed against a layer of hydrophilic material disposed on the surfaces of said reactant flowpaths, such that said reactant flowpaths are covered with said hydrophilic material.

20. A method of reducing water blockage in a fuel cell, said method comprising:
configuring a fuel cell to have an anode, a cathode, an electrolyte disposed between said anode and said cathode, an anode flowpath in fluid communication with said anode and a cathode flowpath in fluid communication with said cathode, a catalyst layer on said anode side of said proton-permeable electrolyte membrane, and a catalyst layer on said cathode side of said proton-permeable electrolyte membrane, said catalyst layer on said anode side and said catalyst layer on said cathode layer having an area;
delivering a first reactant through said anode flowpath and a second reactant through said cathode flowpath, where at least one of said anode and cathode flowpaths comprise an active region and an inactive region, said active region defined by said area of said catalyst layer of said anode side or said cathode side, said inactive region outside said active region where substantially no catalytic reaction takes place;
combining said first and second reactants in an electrochemical conversion reaction in said fuel cell such that a fluid passing through said active region and containing said first or second reactant experiences an increased water content therein;
transporting said fluid containing said increased water content through a hydrophilic member disposed in said inactive region; and
redistributing at least a portion of said increased water content away from said at least one anode or cathode flowpath and into said hydrophilic member.

21. The method of claim 20, wherein said anode and cathode flowpaths are disposed on opposite sides of a bipolar plate that is disposed between adjacent said fuel cells in a fuel cell stack.

22. The method of claim 20, wherein said hydrophilic member comprises a first porous substrate through which said absorbed water may pass.

23. The method of claim 22, wherein said hydrophilic member is part of a water transport device that fluidly connects said anode and cathode flowpaths, said water transport device defining a layered structure further comprising:
a water-permeable membrane disposed against a surface of said hydrophilic member that is away from said at least one anode or cathode flowpath that contains said increased water content; and
a second porous substrate that is disposed against a surface of said water-permeable membrane that is away from said hydrophilic member, said second porous substrate forming part of the one of said at least one anode or cathode flowpath that does not contain said increased water content such that a portion of said increased water content that passes through said hydrophilic member further passes through said water-permeable membrane and said second porous substrate and into said one of said at least one anode or cathode flowpath that does not contain said increased water content to increase the humidity of a fluid passing therethrough.

24. The method of claim 23, wherein said hydrophilic member is part of a water transport device that defines a layered structure further comprising a water-impermeable layer such that said increased water content that is absorbed in said hydrophilic member remains therein.

* * * * *